Aug. 31, 1926.
J. NELSON
1,598,495
UNIVERSAL JOINT BOLT CLIP
Filed July 22, 1925
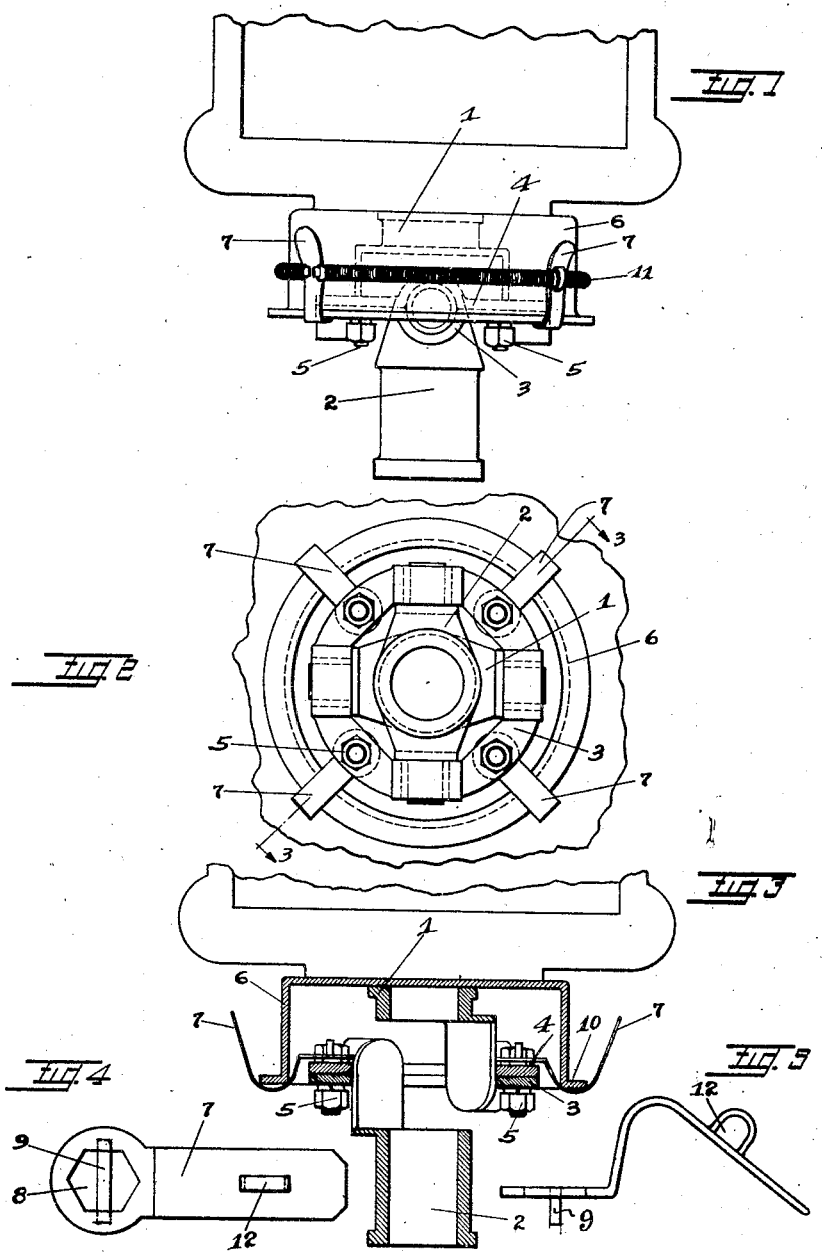
INVENTOR
JOHN NELSON
By C. H. Enochs
ATTORNEY Patented Aug. 31, 1926.

1,598,495

UNITED STATES PATENT OFFICE.

JOHN NELSON, OF BLOOMING PRAIRIE, MINNESOTA.

UNIVERSAL-JOINT BOLT CLIP.

Application filed July 22, 1925. Serial No. 45,443.

One object of my invention is to provide a bolt clip for universal joints and the like that will hold nuts or bolts in position and allow the disassembly of the unit held together by the bolts.

Another object is to provide a bolt clip that will be positioned between a bolt head and another member so as to maintain its position on the bolt head when in position in the unit to which it is applied.

With these and incidental objects in view, the invention consists of certain novel features of construction and combination of parts, the essential elements of which are hereinafter described with reference to the drawing, which accompanies and forms a part of this specification:

In the drawing, Figure 1 is a plan view of a transmission of the type used in such cars as the Dodge. Figure 2 is an end elevation of the same. Figure 3 is a section taken on the line 3—3, Figure 2. Figure 4 is a plan view of my improved clip, and Figure 5 is a side elevation of the same.

In the universal joint shown in the drawing, the joint proper consists of two yokes or forks, 1 and 2, assembled with suitable bushings in the pair of rings 3 and 4. These rings are bolted together by bolts 5, forming a type of universal joint well known to those skilled in the art.

In working on a joint of this type, it is ordinarily necessary to remove the bolt 5 to replace bushings or for some other reason and it is extremely difficult to disassemble this joint and then get the joint back together, as the bolts tend to come out of position, and working in the narrow space inside of the housing 6, it is an extremely difficult job to replace bolts that have fallen out and to keep them in alignment so that the rings can be put back together on the bolt.

For that reason I have devised the clips 7, shown in detail in Figures 4 and 5 and these clips have hexagonal apertures 8 in one end thereof with a bridge 9 formed from the metal and crossing the hexagonal aperture. This aperture is adapted to suitably fit over the head of the bolts and the clip encircles the lip of the housing 6, as at 10, Figure 3.

With the clips in place as shown, a spring 11, Figure 1, is drawn thru the loops 12, provided in the clips, so as to hold all the clips firmly against the lip of the housing 6 and thus furnish a firm support for the bolt heads so that when the nuts are loosened and the first ring 3 removed, the bolts will be firmly held in place and after the necessary work has been accomplished, the ring may be placed back over the bolts and the nuts with their lock washers assembled thereon, with no difficulty whatsoever.

While I have described my invention and illustrated it in one particular construction, I do not wish it understood that I limit myself to this particular embodiment, as it is evident that the application of the invention may be varied in many ways within the scope of the following claims.

I claim:—

1. The combination with a housing having a bolt positioned within said housing, of a clip having an aperture in one end thereof adapted to encircle the head of said bolt, a bridge on said clip across said aperture to restrain the backward movement of the head of said bolt, said clip being formed to impinge against the lip of said housing and means for restraining said clip in position with said housing.

2. A bolt clip having a head with an aperture therein, a bridge positioned across said aperture, an upstanding extension from said head and at an angle thereto, a downwardly angularly projecting finger extending from the free end of said upward extending portion, said finger having means thereon for the attachment thereto of restraining means for said clip.

3. The combination with a housing having a bolt positioned therewithin, of a substantially S-shaped clip having a recess in one end thereof for engagement with the head of the bolt, one loop of said clip being arranged to impinge against the edge of the housing for the purpose of retaining the bolt in a predetermined position.

4. The combination with a housing having a bolt positioned therewithin, of a substantially S-shaped clip having a recess in one end thereof for engaging the head of the bolt, the other loop of said clip being arranged so that it will impinge against a portion of the housing for the purpose of retaining the bolt in a predetermined position, and means comprising a looped spring for yieldingly securing the clip in a predetermined position with respect to the housing.

5. The combination with a circular housing having an annular series of bolts therewithin, of a series of clips arranged about the edge of the housing, one for each bolt, each clip being arranged to engage the head end of the bolt with its inner end, and an annularly arranged spring member connecting the outer ends of the clips.

6. A bolt clip, for retaining a bolt in a predetermined position within a housing, comprising a metallic strip having an inwardly directed head end for engaging the head of the bolt, and having its outer end portion reversely curved for impinging engagement with the housing.

JOHN NELSON.